United States Patent
Ben David et al.

(10) Patent No.: US 11,875,123 B1
(45) Date of Patent: Jan. 16, 2024

(54) ADVICE GENERATION SYSTEM

(71) Applicant: Intuit Inc., Mountain View, CA (US)

(72) Inventors: Daniel Ben David, Hod Hasharon (IL); Kenneth Grant Yocum, Encinitas, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/362,890

(22) Filed: Jul. 31, 2023

(51) Int. Cl.
*G06F 40/30* (2020.01)
*G06N 20/00* (2019.01)
*G06F 40/40* (2020.01)
*G06F 40/103* (2020.01)

(52) U.S. Cl.
CPC .......... *G06F 40/30* (2020.01); *G06F 40/103* (2020.01); *G06F 40/40* (2020.01); *G06N 20/00* (2019.01)

(58) Field of Classification Search
CPC ........ G06F 40/103; G06F 40/30; G06F 40/40; G06N 20/00
See application file for complete search history.

(56) References Cited

U.S. PATENT DOCUMENTS

| | | | |
|---|---|---|---|
| 10,754,946 B1 * | 8/2020 | Gribelyuk | G06F 21/552 |
| 2020/0065384 A1 * | 2/2020 | Costello | G06N 3/04 |
| 2020/0202070 A1 * | 6/2020 | Lee | G06F 16/3329 |
| 2022/0247700 A1 * | 8/2022 | Bhardwaj | H04L 51/046 |

FOREIGN PATENT DOCUMENTS

CN 116561276 A * 8/2023

OTHER PUBLICATIONS

Google Translation of CN116561276A, 2023, https://patents.google.com/patent/CN116561276A/en?oq=CN+116561276 (Year: 2023).*

* cited by examiner

*Primary Examiner* — Eric Yen
(74) *Attorney, Agent, or Firm* — FERGUSON BRASWELL FRASER KUBASTA PC (57) ABSTRACT

The one or more embodiments provide for a method, system, and computer program product, an intent, generated by a large language model from a text, is received from a user device as a first input to an advice planner. A state of an account is received as a second input to the advice planner. The advice planner classifieds the intent into a domain corresponding to the intent, and generates, as output, a plan comprising a first set of action logic associated with the domain. Each action logic is a discrete step in an ordered sequence for achieving a desired state of the account. The advice planner forwards the plan to the large language model (LLM). The large language model receives the plan as input and generates advice in a natural language format as output. The advice is then forwarded to the user device.

20 Claims, 7 Drawing Sheets

ADVICE GENERATION SYSTEM

BACKGROUND

Advice systems are intelligent software platforms or tools designed to provide valuable guidance, recommendations, and knowledge to users based on data analysis, machine learning, and domain expertise. These systems leverage vast amounts of data and advanced algorithms to extract meaningful insights, identify patterns, and make informed predictions.

Advice systems collect and process data from various sources, including user inputs, historical records, external databases, and real-time feeds. They use this data to understand user preferences, behavior, and needs, as well as to analyze trends and correlations within the dataset. Using machine learning and statistical techniques, these systems develop models and algorithms to recognize patterns, make predictions, and generate recommendations.

Current advice systems often suffer from several shortcomings that limit their effectiveness and user satisfaction. These systems typically provide generic or one-size-fits-all advice, which fails to address the specific needs and circumstances of individual users. As a result, users may receive irrelevant or impractical recommendations that do not align with their personal situations and aspirations.

Existing advice systems often lack the capability to adapt and learn from user interactions and feedback. They rely on static models or predefined rules, which hinder their ability to evolve and improve over time. Consequently, the advice provided may become outdated or fail to keep up with changing conditions.

Additionally, many advice systems struggle with generating comprehensible advice in a user-friendly manner. The advice may be presented in technical or complex jargon, making it difficult for non-experts to understand and act upon the recommendations effectively. This lack of clear communication can lead to confusion and mistrust, diminishing the value of the advice and the overall user experience.

SUMMARY

The one or more embodiments provide for a method. The method includes receiving as a first input to an advice planner, an intent generated by a large language model from a text received from a user device. the method further includes receiving as a second input, by the advice planner, a state of an account. the method additionally includes classifying, by the advice planner, the intent into a domain corresponding to the intent. the method also includes generating as output, by the advice planner, a plan comprising a first set of action logic associated with the domain. Each action logic is a discrete step in an ordered sequence for achieving a desired state of the account. The method includes forwarding, by the advice planner, the plan to the large language model (LLM), wherein the large language model receives the plan as input and generates advice in a natural language format as output. the method further includes forwarding the advice to the user device.

The one or more embodiments provide for a system. The system comprises a data repository storing an advice library. the advice library comprises as an ontology of action logic formatted as a set of machine-interpretable logic descriptions. The system further comprises a computer processor for executing an advice planner. The advice planner is configured to receive, as a first input, an intent generated by a large language model from a text received from a user device. The advice planner is further configured to receive, as a second input, a state of an account. The advice planner is configured to classify the intent into a domain corresponding to the intent. The advice planner is additionally configured to generate, as output, a plan comprising a first set of action logic associated with the domain. Each action logic in the first set is a discrete step in an ordered sequence for achieving a desired state of the account. The advice planner is configured to forward the plan to the large language model (LLM). The large language model receives the plan as input and generates advice in a natural language format as output. The advice is then forwarded to the user device.

The one or more embodiments provide for a non-transitory computer readable storage medium storing program code which, when executed by a processor, performs a computer-implemented method. The computer-implemented method comprises receiving as a first input, by an advice planner, an intent generated by a large language model from a text received from a user device. The computer-implemented method further comprises receiving as a second input, by the advice planner, a state of an account. The computer-implemented method further comprises classifying, by the advice planner, the intent into a domain corresponding to the intent. The computer-implemented method further comprises generating as output, by the advice planner, a plan comprising a first set of action logic associated with the domain. Each action logic is a discrete step in an ordered sequence for achieving a desired state of the account. The computer-implemented method further comprises forwarding, by the advice planner, the plan to the large language model (LLM). the large language model receives the plan as input and generates advice in a natural language format as output. The computer-implemented method further comprises forwarding the advice to the user device.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to a machine learning advice generation system enables the provision of hyper-personalized advice to a user depending on their individual circumstances: The machine learning advice generation system leverages customer data, fine-tuned models, reinforcement learning, and problem classification to provide highly personalized advice. Users can interact with the system by either asking their own questions or automatically generating commonly asked and useful advice-related queries. Through continuous refinement and evaluation, the system can deliver valuable and actionable guidance tailored to individual needs of each user.

A Large Language Model (LLM) is tuned using a set of predefined common business and advice-related questions, ensuing that the LLM understands and can respond effectively to a wide range of queries. To further enhance the accuracy our advice for small businesses, the LLM can be tuned specifically using data from smaller enterprises. as publicly available data often focuses on larger-scale companies, the as-tuned LLM may more accurately account for the unique challenges and circumstances faced by such businesses, Relevant data is gathered from the user, including their current financial state, financial reports, and necessary transactional data. This data is input into the LLM and forms the basis for the personalized advice. Output from the LLM is analyzed by a classification model to characterize the user's intent within a known ontology, enabling the system to address the specific problems raised by the user and offer targeted advice that is tailored to the customer's unique circumstances and requirements.

The generated advice can be surfaced to the user either through a system interface or fed back to the LLM for further refinement. This feedback loop enables continuous improvements of the system's performance while ensuring that the advice remains up-to-date and relevant.

User receptiveness to the advice is evaluated by assessing changes to the overall user state. This evaluation is implemented as part of a reinforcement learning (RL) process using an iterative feedback loop of continuously improve annotation. This RL process helps to gauge the effectiveness of the advice, automatically refining the system's responses over time.

Figure 1:
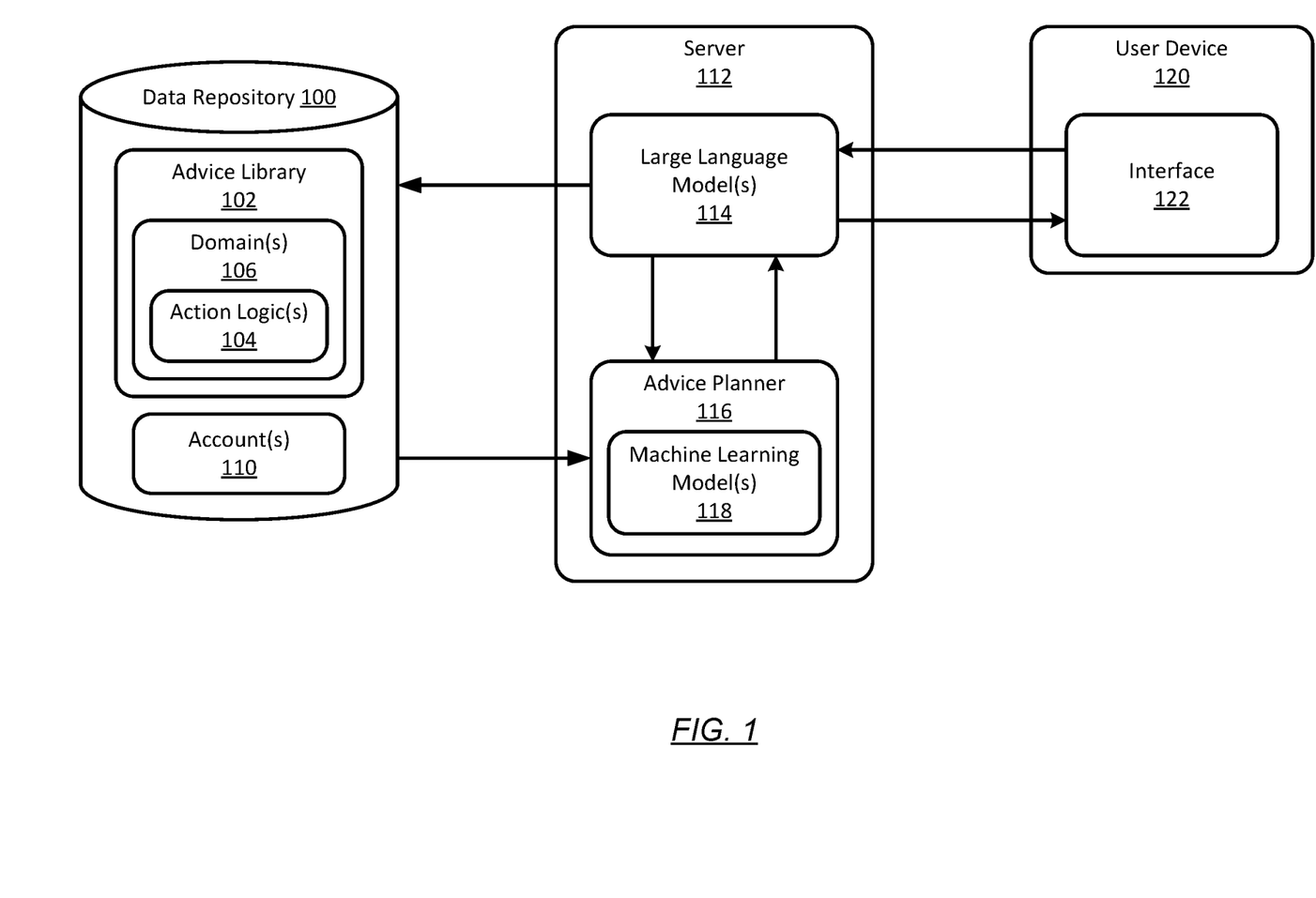
FIG. 1 shows a computing system in accordance with one or more embodiments of the invention.

Turning to FIG. 1, a diagram of a computing system is illustrated in accordance with one or more embodiments. The computing system includes data repository (100). In one or more embodiments of the invention, the data repository (100) is any type of storage unit and/or device (e.g., a file system, database, data structure, or any other storage mechanism) for storing data. Further, the data repository (100) may include multiple different, potentially heterogeneous, storage units and/or devices.

The data repository (100) stores an advice library (102). The advice library (102) may consist of files, which may include source code, compiled code, data files, documentation, or other resources. Primarily, the advice library (102) serves as a repository of action logic(s) (104). The action logic(s) (104) are a set of machine-interpretable text describing a policy for effecting a state change do a user account, such as one of the account(s) (108). Action logic(s) can be human readable, but are not necessarily natural language text. For example, an action logic(s) (104) can be formatted as a JavaScript Object Notation (JSON) object. When composed into a set of one or more action logics, each action logic(s) (104) defines a discrete step in an ordered sequence for achieving a desired state of an account(s) (108).

Within the advice library (102), action logic(s) (104) are organized into an ontology of one or more domain(s) (106). Each of the domain(s) (106) is a logical grouping of action logic(s) (104) according to the purpose, functionality, and/or state change intended by the action logic(s) (104).

For example, an ontology directed to financial advice may include multiple domain(s) (106) associated with common financial advice issues. For example, the ontology may include domain(s) (106) for budgeting and financial planning, associated with action logic(s) (104) that focus on creating a comprehensive budget and financial plan tailored to one's income, expenses, and goals. The ontology may include domain(s) (106) for debt management, associated with action logic(s) (104) directed to strategies for managing and reducing debt, evaluating consolidation options, and prioritizing repayment. Additional examples for domain(s) (106) include retirement planning, investment and wealth management, tax planning, insurance and risk management, and estate planning, with each of these additional domains having action logic(s) (104) that correspond to those additional domains.

Data repository (100) stores account(s) (110). Each account(s) (110) is a set of data about a user. The specific information included in the account(s) (110) would depend on the context and purpose However, the account(s) includes relevant details and characteristics of the user within a related system or platform.

For example, account(s) (110) may include profile information such as the user's personal information, contact details, preferences, as well as any other demographic or identification data associated with their account. in the context of financial advice or planning, the account may financial data, such as user's financial records, transaction history, income, expenses, assets, account balances, liabilities, historical data, usage patterns, and/or other financial metrics.

The system shown in FIG. 1 includes one or more server(s) (112). The server(s) (112) is one or more computers, possibly communicating in a distributed computing environment. The server(s) (112) may include multiple physical and virtual computing systems that form part of a cloud computing environment. Thus, the server(s) (112) includes one or more processors. The processor can be hardware, or a virtual machine programmed to execute one or more controllers and/or software applications. For example, the processors of the server(s) (112) may be the computer processor(s) (1002) of FIG. 10A.

The server(s) (112) may host applications, such as websites, and may serve structured documents (hypertext markup language (HTML) pages, extensible markup language (XML) pages, JavaScript object notation (JSON) files and messages, etc.) to interact with user devices connected via a network. Execution of the instructions, programs, and applications of the server(s) (112) is distributed to multiple physical and virtual computing systems in the cloud computing environment Server(s) (112) may host a Large Language Model (114). A large language model (LLM) is a sophisticated computational system characterized by its extensive capacity to comprehend and generate natural language text. It encompasses a complex network of interconnected artificial intelligence algorithms and statistical models that enable it to process, understand, and produce human-like language patterns and structures. The large nature of the model refers to its vast size, typically involving billions of parameters, which allows it to capture and learn from a vast amount of linguistic and textual data. The LLM's capabilities extend beyond simple rule-based or pattern matching approaches, exhibiting the ability to generate coherent and contextually relevant textual responses, predictions, or summaries. The extensive size and linguistic knowledge of the LLM enable it to exhibit a high degree of language understanding and generation proficiency in various natural language processing applications, including but not limited to text generation, language translation, sentiment analysis, and question-answering systems.

A "Large Language Model" refers to a specific category of language models that are characterized by their extensive size and complexity. For example, a Large Language Model (114) based on a transformer architecture, such as OpenAI's GPT models, Nvidia's Megatron-LM, or Microsoft's Turing-NLG, utilizes massive data sets and scaling of the transformer architecture. For example, the GPT-3 training data set includes results from a massive web crawl. This volume of data allows the expansion of GPT-3 to 175 billion parameters using 96 attention layers, each with a 96×128 dimension head, enabling few or zero-shot training paradigms. By prompting the model with a few response paradigms, the GPT-3 model understands the context, produces results, and can structure its response automatically, without retraining parameters.

The server(s) (112) includes an advice planner (116). The advice planner (116) is one or more applications or application specific hardware programmed to control operation of the machine learning model(s) (118).

In one embodiment, the machine learning model(s) (118) may include one or more artificial neural networks with one or more layers. For example, the machine learning model(s) (118) may include a recurrent neural network, a long-short term memory (LSTM), a gated recurrent unit (GRU), a transformer neural network, a fully connected network, etc.

In some embodiments, the machine learning model(s) (118) comprise one or more classification models. A "classification model" is a computational model or algorithm designed to categorize or assign input data into predefined classes or categories based on their features or characteristics. Classification models aim to determine the most appropriate class label for a given input based on patterns or relationships learned from training data. Classification models may be based on various architectures and/or techniques, such as statistical analysis, logistic regression, decision trees, random forest, support vector machines, and/or neural networks.

The system shown in FIG. 1 includes User device (120). A "user device" refers to a physical or virtual entity utilized by an individual for accessing and interacting with computer-based systems, applications, or services. User device (120) encompasses various hardware or software components that enable users to perform tasks, access information, or communicate with other entities. User device (120) can take different forms, including but not limited to desktop computers, laptops, smartphones, tablets, wearable devices, and virtual machines.

User device (120) includes an interface (122) that enables a user to interact with. the large language models (114,) and/or the advice planner (116). As used herein, an "interface" refers to a defined boundary or connection point between different components and/or systems. The interface facilitates the exchange of information, commands, or data between software applications and/or system components in a standardized and consistent manner Interface (122) can be manifested in various forms, including a graphical user interface (GUI) and an application programming interface (API).

Figure 2:
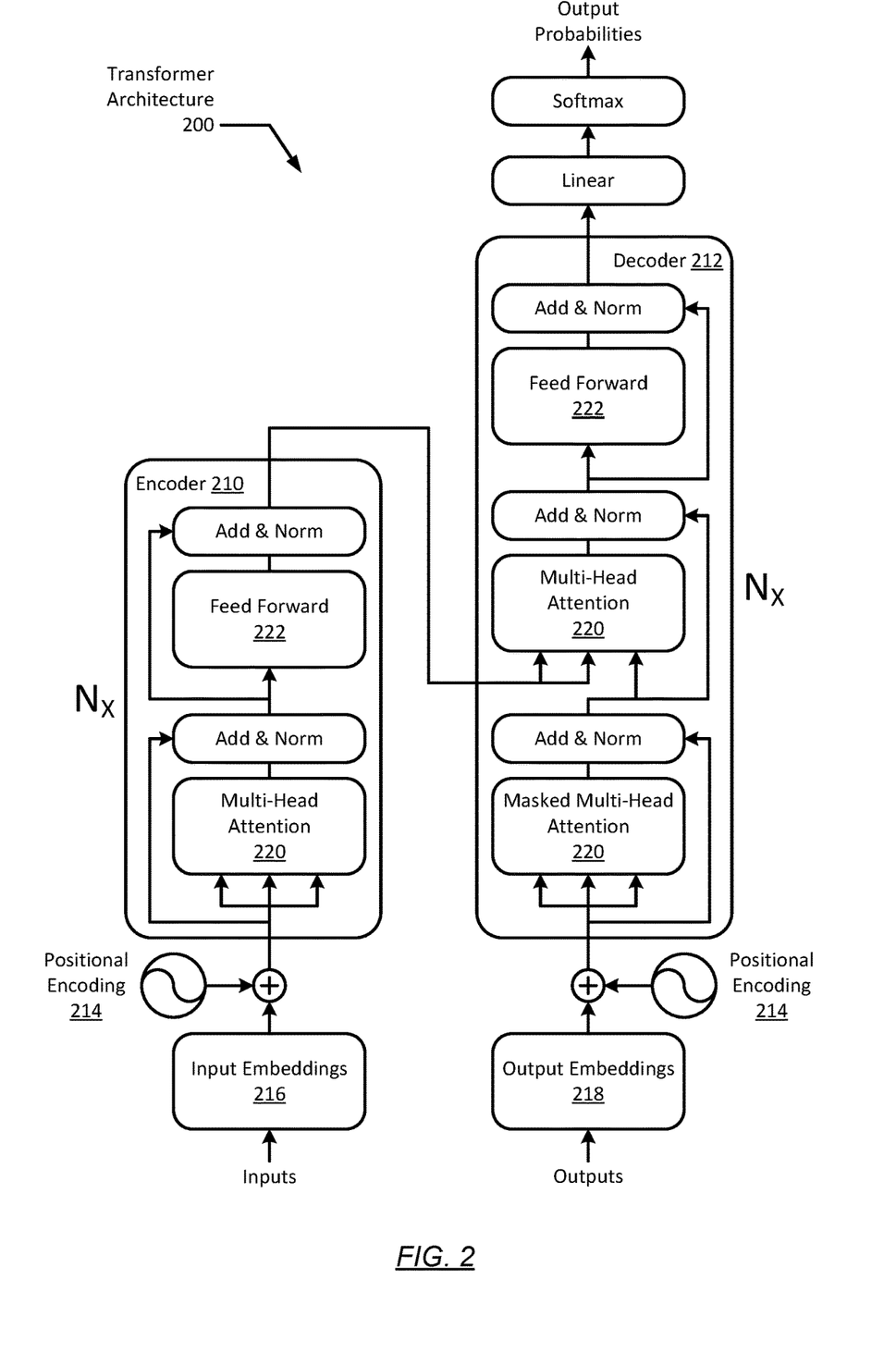
FIG. 2 is a transformer architecture shown in accordance with one or more embodiments of the invention.

FIG. 2 illustrates a transformer architecture. Transformer architecture (200) can be used to implement the large language model (114) and/or the machine learning model(s) (118) of FIG. 1.

The transformer architecture (200) relies on a self-attention (intra-attention) mechanism, thereby eliminating the recurrent operations computed in Recurrent Neural Networks, which may be used to compute the latent space representation of both the encoder (210) and decoder (212) sides. Positional encoding (214) is added to the input and output embeddings (216, 218) with the absence of recurrence. The positional information, which is similar to a time-step in a recurrent network, provides the Transformer network with the order of input and output sequences. A combination of absolute positional encoding and relative positional information may be used. Input from the previously generated symbol is auto-regressively used by the model for the next prediction which is organized as a stack of encoder-decoder networks. In addition, uniform layers compose both the encoder (210) and decoder (212), and each layer is built of two sublayers: a multi-head self-attention layer (220) and a position-wise feed-forward network (FFN) layer (222). The multi-head sub-layer (220) enables the use of multiple attention functions with an equivalent cost of utilizing attention, while the FFN sub-layer (222) uses a fully connected network to process the attention sublayers. The FFN applies multiple linear transformations on each position and a Rectified Linear Unit (ReLU) which extends the self-attention mechanism to efficiently consider representations of the relative positioning (i.e., distances between sequence elements).

While FIGS. 1-2 show a configuration of components, other configurations may be used without departing from the scope of the invention. For example, various components may be combined to create a single component. As another example, the functionality performed by a single component may be performed by two or more components.

Figure 3:
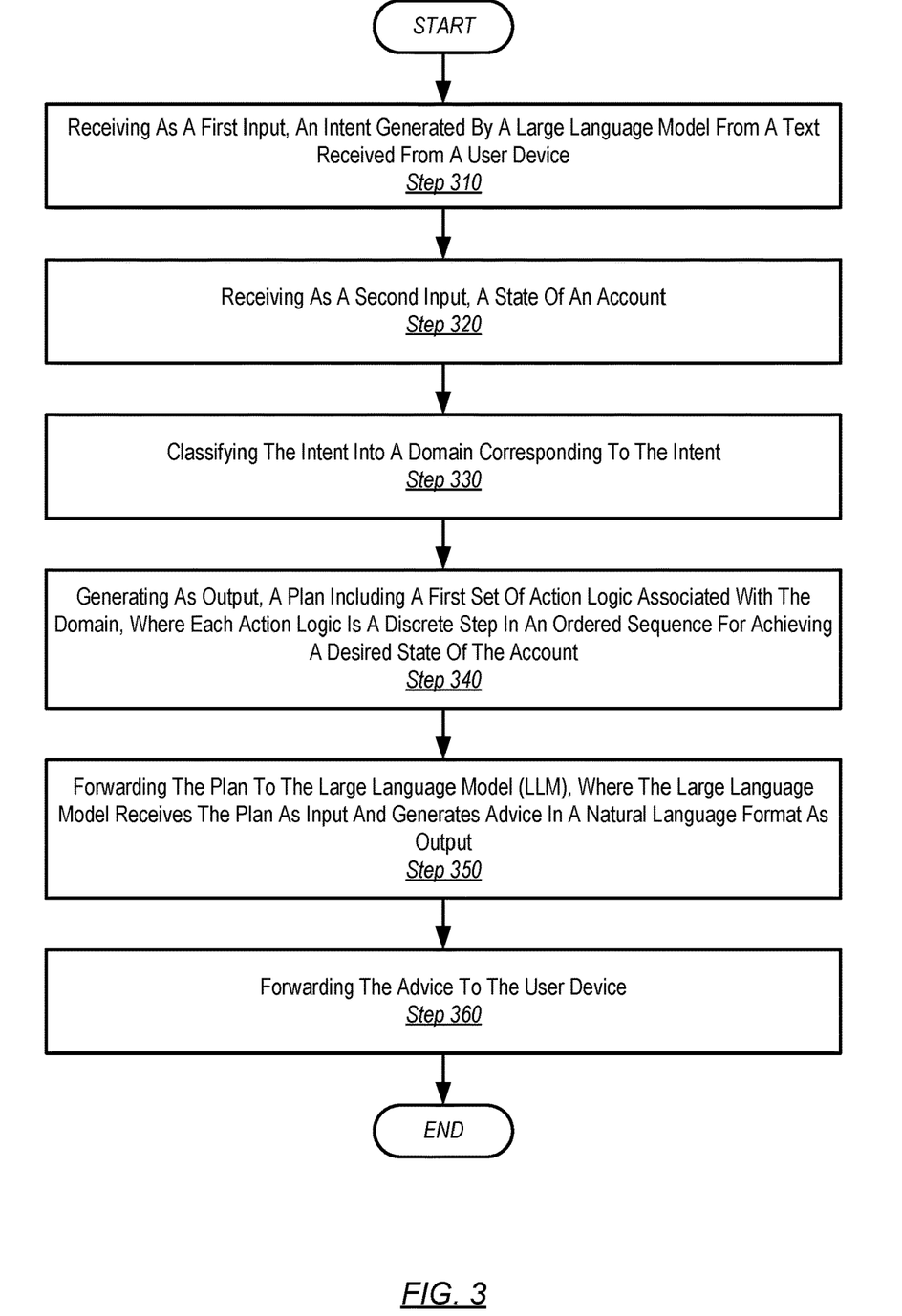
FIG. 3 is a method for generating advice in accordance with one or more illustrative embodiments.

Turning to FIG. 3, a method for generating advice is shown in accordance with one or more illustrative embodiments. The method illustrated in FIG. 3 can be performed by one or more components of the computing system FIG. 1, such as the advice planner (116).

At Step 310, an intent generated by a large language model is received as a first input to the advice planner. The Intent is generated by the large language model from a text received from a user device.

The text data, such as in documents, emails, social media posts, and web pages, can be provided to the LLM through an interface, either directly through a user interface of the user device, or through an API call from the advice planner. Unlike structured data, text data lacks a fixed format and can vary in length, style, and content. It is represented as sequences of characters encoded in a specific scheme. Text data can be represented as a series of characters encoded in a specific character encoding scheme, such as ASCII, UTF-8, or Unicode. The text input serves as the foundation for generating the intent by the LLM. Based on the text data, the LLM generates an intent that captures the user's purpose or goal.

large language model utilizes its extensive training on language patterns and semantic understanding to decipher the user's text input and generate an intent that accurately reflects their intention. The LLM leverages its understanding of natural language to extract the key meaning and purpose from the user's text, enabling a more precise intent generation process.

By incorporating the text input as the first input to the advice planner, the method allows for a seamless integration of user communication with the system. Users can conveniently express their intents or desires by simply typing their request in natural language, making the interaction more intuitive and user-friendly.

At Step 320, a state of an account is receiving as a second input to the advice planner. In some embodiments, the second input to the advice planner is a vector input that represents the state of the account.

For example, the account may include or reference financial data (records of financial transactions, records of accounts, etc.). The vector input are sets of input features extracted from data based on the of state of the account. For example, where the account includes financial data, the vector input include financial features extracted from the financial data. The financial features may include records of transactions, statistical attributes (e.g., mean transaction value, mode of transaction type, etc.), account balances, monthly income, etc. The vector input may be generated with a feature extractor that processes the financial data with one or more numerical transformations and algorithms.

Different input features may represent different attributes of an input. With financial data as an input, attributes represented by input features may include transaction information, statistical attributes (e.g., mean transaction value, mode of transaction type, etc.), account balances, etc. The order and type of input features may be the same between different input vectors for the same type of data.

The account state can be obtained from external sources, such as financial institutions or platforms. If the account state is obtained from external sources, the state may be retrieved in a structured format, such as JSON or XML. The advice planner utilizes parsing techniques to extract the relevant financial metrics from the retrieved data and transform them into the vector representation. The vector is then populated with the corresponding financial values. Regardless of the source, the vector input serves as a structured representation of the account's state, with each element within the vector corresponding to specific data elements in the account.

At Step 330, the intent is classified by the advice planner into a domain corresponding to the intent. In some embodiments, the advice planner comprises classification model.

For example, the output of the advice planner can be a vector representation of the state of the account. The intent can be classified by calculating a similarity metric, e.g., cosine similarities, between the output vector of the advice planner and vector representations for the domains stored in the advice library. of the state can be to a selected class or satisfy a threshold, whereas the output for the input vector may not be to the selected class or not satisfy the threshold. For example, an input vector may have an output that is below a threshold and a counterfactual vector generated from the input vector (by adjusting the values of the input vector along the dimensions of the components (129) may have an output that is above the threshold. With the output vector from the advice planner below a threshold, the intent may not correspond to the selected class. With the output vector from the advice planner above the threshold, the intent may correspond to the selected class.

At Step 340, a plan is generated as output from the advice planner. The plan comprises a first set of action logic associated with the domain. Each action logic is a discrete step in an ordered sequence for achieving a desired state of the account. In some embodiments, the first set of action logic is defined in an ontology stored in an advice library as a set of machine-interpretable logic descriptions.

To generation of the plan, the advice planner interacts with the advice library, which serves as a repository of knowledge. Within the advice library, an ontology of domains is stored. The ontology defines the relationships, dependencies, and ordering of the action logic associated with each domain. The advice planner accesses the stored ontology within the advice library to retrieve the relevant first set of action logic for the identified domain. Accessing the advice library may involve querying the ontology using suitable algorithms or data retrieval techniques to identify the action logic associated with the domain that was identified.

The action logic is machine-interpretable, which can be in a format that can be readily understood and processed by the computer systems. Each action logic represents a discrete logical step that can be organized into an ordered sequence that guides the user towards achieving a desired state of their account. The advice planner then arranges the action logic steps in the desired order to ensure a logical flow within the generated plan.

At Step 350, the plan is forwarded to the large language model (LLM). The large language model receives the plan as input and generates advice in a natural language format as output.

The plan generated by the advice planner is forwarded to the LLM as input. This can be achieved through suitable protocols or APIs that facilitate the transmission of data between the advice planner and the LLM. The plan can be formatted according to a prompt template, influencing the LLM. to interpret inputs in an equivalent manner, and produce similarly formatted output. Upon receiving the plan as input, the LLM employs its natural language processing capabilities to analyze and understand the content of the plan, and to generate advice. The advice is generated in a natural language format.

At Step 360, the advice is forwarded to the user device. The advice can be communicated directly to the user, device, or sent to the advice planner where it is forwarded to the user device. The advice may be transmitted back to the user device using appropriate communication protocols or APIs, ensuring the secure and efficient delivery of the advice.

On the user device, the advice is received and presented to the user in the natural language format. The advice may be displayed as text on a user interface, such as a mobile application or a web page. The user can then access and read the advice provided by the advice planner and the LLM.

Figure 4:
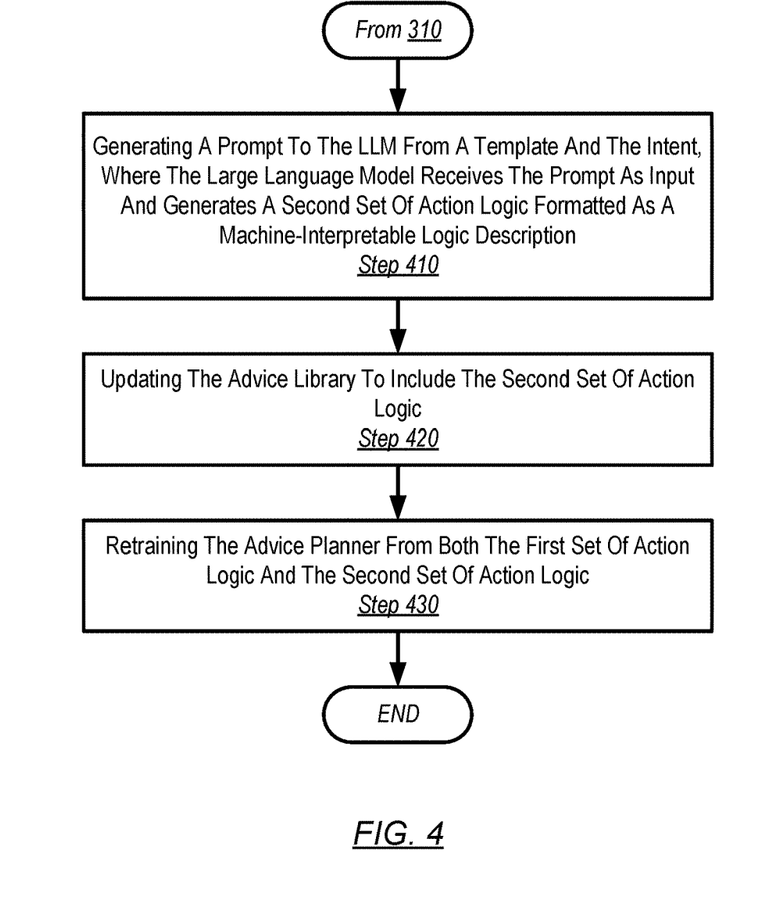
FIG. 4 is a method for updating and advice library in accordance with one or more illustrative embodiments.

Turning to FIG. 4, a method for updating and advice library is shown in accordance with one or more illustrative embodiments. The method illustrated in FIG. 4 can be performed by one or more components of the computing system FIG. 1, such as the advice planner (116).

At Step 410, a prompt to the LLM is generated from a template and the intent. To generate the prompt, the advice planner interacts with a prompt template and the intent. The prompt template provides a structured framework that guides the generation of the prompt. It may include placeholders or variables that are replaced with specific information based on the intent. The advice planner combines the prompt template and the intent to form a cohesive prompt that captures the necessary information for the LLM. This prompt is then provided as input to the LLM. The prompt serves as an input to the LLM.

Upon receiving the prompt as input, the LLM processes the prompt and generates a second set of action logic that corresponds to the intent and aligns with the structure of the prompt template. The generated action logic is formatted as machine-interpretable logic descriptions, allowing for seamless integration into the advice generation process.

At Step 420, the advice library is updated to include the second set of action logic. The advice library is updated to include the newly generated second set of action logic. ensures that the advice library remains comprehensive and up to date with the latest information and recommendations. The advice library may employ suitable storage mechanisms and data structures to efficiently organize and store the action logic descriptions. Updating the advice library with action logics generated by the LLM may uncover potentially relevant information buried in the LLM's immense training corpus.

At Step 430, the advice planner is retrained from both the first set of action logic and the second set of action logic. The advice planner incorporates both the first set of action logic, obtained from previous steps, and the newly generated second set of action logic. The retraining process involves updating the advice planner's algorithms, models, or parameters using the combined knowledge from the first and second sets of action logic. The retraining ensures that the advice planner can account for the relevant information unearthed from the LLM to generate accurate and effective advice.

Figure 5:
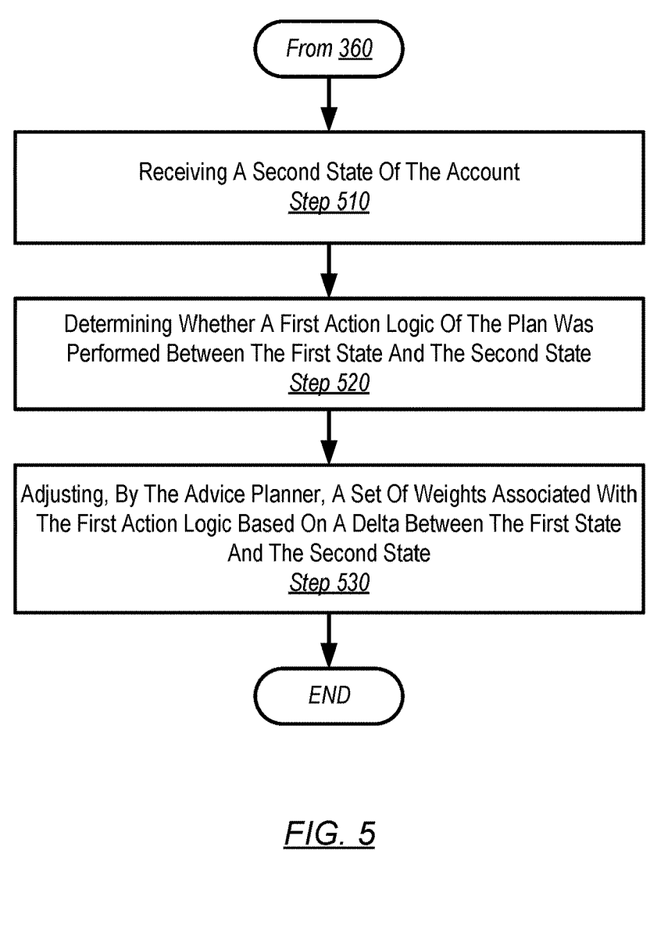
FIG. 5 is a method for updating and advice planner in accordance with one or more illustrative embodiments.

Referring now to FIG. 5, a method for updating and advice planner is shown in accordance with one or more illustrative embodiments. The method illustrated in FIG. 5 can be performed by one or more components of the computing system FIG. 1, such as the advice planner (116)

In some embodiments, the advice planner comprises a reinforcement learning model. A reinforcement learning model is a type of machine learning model that learns from interaction and feedback. The reinforcement learning model is trained to optimize decision-making and action selection based on observed states and their associated rewards or outcomes.

In some embodiments, the state is a first state of the account. For example, when providing financial advice, the first state of the account may represent an initial financial state or condition of the user's account. This state may include information such as account balances, transaction history, or other relevant financial metrics.

At Step 510, a second state of the account is received. In other words, the advice planner receives the second state of the account at a later point in time. Continuing with the example of providing financial advice, the second state represents an updated financial state. This updated state may be obtained through regular updates or interactions with the user's account, such as new transactions, changes in balances, or other relevant updates.

At Step 520, method determines whether a first action logic of the plan was performed between the first state and the second state. In other words, the advice planner then determines whether the first action logic from the plan, which was generated in a previous step, was performed between the first and second states. The determination involves comparing the action logic with the sequence of actions taken or events observed between the two states. If the first action logic was indeed performed, the advice planner proceeds with further adjustments.

At Step 530, a set of weights associated with the first action logic is adjusted based on a difference between the first state and the second state. Based on the delta or difference between the first and second states, the advice planner adjusts a set of weights associated with the first action logic. These weights represent the importance or influence of the action logic in achieving the desired state of the account. The adjustment of weights is performed to enhance the effectiveness and relevance of the action logic based on the observed changes between the states.

The advice planner may utilize any suitable techniques within the reinforcement learning model to adjust the weights. This may involve reward-based learning, where positive or negative rewards are assigned based on the outcomes or improvements observed between the states. The weights are then updated through techniques such as gradient descent or other optimization algorithms to reinforce or modify the influence of the first action logic.

Figure 6:
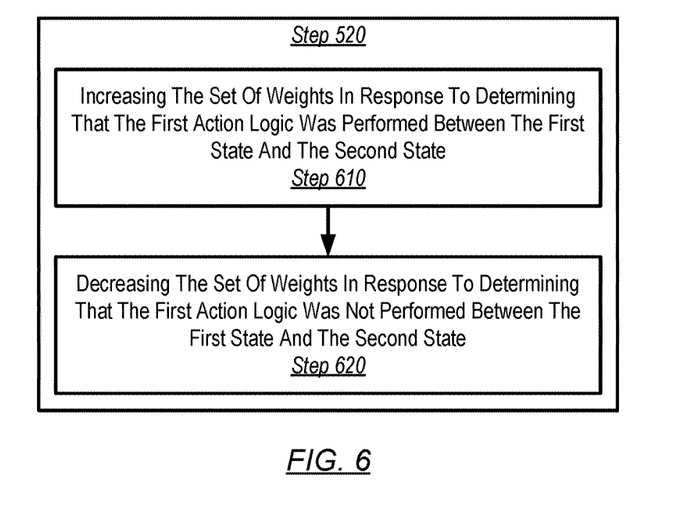
FIG. 6 is a method for adjusting weights in an advice planner in accordance with one or more illustrative embodiments.

Referring now to FIG. 6, a method for adjusting weights in an advice planner is shown in accordance with one or more illustrative embodiments. The method illustrated in FIG. 6 can be performed by one or more components of the computing system FIG. 1, such as the advice planner (116).

Initially, the advice planner receives the first state of the account, which represents the initial financial state. The first action logic, derived from a previous step, consists of a set of discrete steps in an ordered sequence for achieving the desired state of the account. The advice planner determines whether these steps were performed between the first and second states.

At a later point, the advice planner receives the second state of the account, representing an updated financial state. The advice planner compares the sequence of actions or events observed between the first and second states with the first action logic to determine if the steps were executed. Based on the determination of whether the first action logic was performed, the advice planner adjusts the set of weights accordingly.

At Step 610, the set of weights is increased in response to determining that the first action logic was performed between the first state and the second state. For example, if it is determined that the first action logic was indeed performed between the two states, indicating that progress was made towards the desired outcome, the set of weights is increased. This adjustment reinforces the influence and importance of the first action logic in achieving the desired state. This adjustment optimizes the advice planner's decision-making and adapt the influence of the action logic based on the observed execution of the action logic.

At Step 620, the set of weights is decreased in response to determining that the first action logic was not performed between the first state and the second state. For example, if it is determined that the first action logic was not performed, suggesting a deviation from the desired outcome or an alternative approach, the set of weights is decreased. This adjustment reduces the impact of the first action logic, signaling the need for alternative actions or adjustments.

Figure 7:
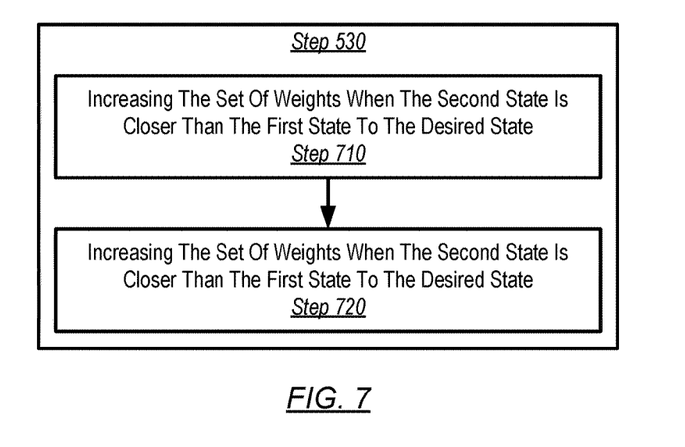
FIG. 7 is a method for adjusting weights in an advice planner in accordance with one or more illustrative embodiments.

Referring now to FIG. 7, a method for adjusting weights in an advice planner is shown in accordance with one or more illustrative embodiments. The method illustrated in FIG. 7 can be performed by one or more components of the computing system FIG. 1, such as the advice planner (116).

Initially, the advice planner receives the first state of the account, representing the initial financial state. This state is compared to the desired state, which encapsulates the financial condition or outcome the user aims to achieve. The proximity or similarity between the first state and the desired state is assessed using suitable metrics or calculations.

At a later point, the advice planner receives the second state of the account, representing an updated financial state. Again, the proximity of the second state to the desired state is evaluated using appropriate metrics. This evaluation may involve the comparison of financial metrics, such as account balances, debt levels, or investment performance, between the second state and the desired state. Based on the comparison between the two states and their proximity to the desired state, the advice planner adjusts the set of weights associated with the first action logic At Step 710, the set of weights is increased when the second state is closer than the first state to the desired state. When the second state is closer to the desired state than the first state, indicating progress towards the desired outcome, the set of weights is increased. This adjustment reinforces the importance and influence of the first action logic in achieving the desired state.

At Step 720, the set of weights is decreased when the first state is closer than the second state to the desired state. When the first state is closer to the desired state than the second state, suggesting a deviation from the desired outcome, the set of weights is decreased. This adjustment diminishes the impact of the first action logic, signaling the need for alternative actions or adjustments to achieve the desired state.

The adjustment of weights can be implemented using suitable techniques within the advice planner, such as updating the weights based on predefined rules, reward-based learning, or gradient-based optimization algorithms. The technical implementation of these techniques may involve mathematical calculations, iterative updates, or other optimization methods to appropriately adjust the set of weights.

Figure 8:
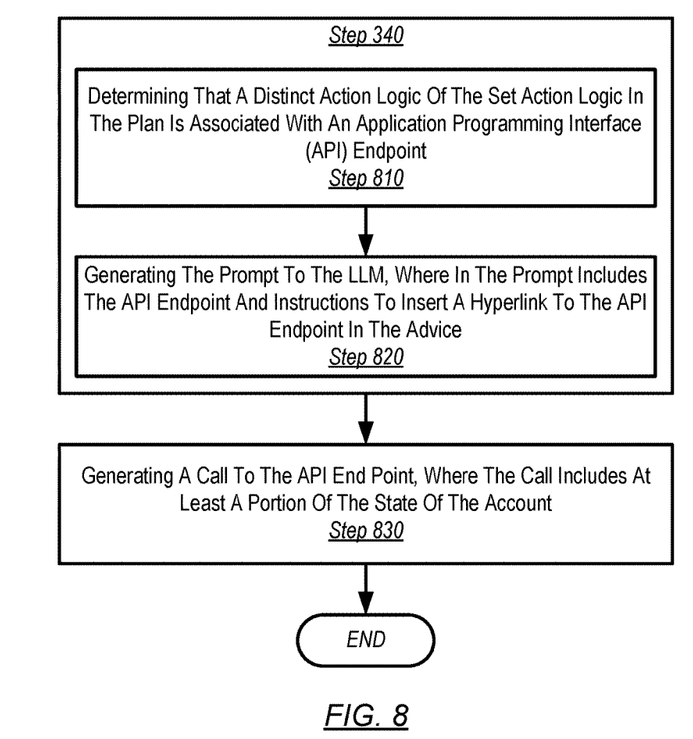
FIG. 8 is a method for generating a prompt to the LLM is shown in accordance with one or more illustrative embodiments.

Referring now to FIG. 8, a method for generating a prompt to the LLM is shown in accordance with one or more illustrative embodiments. The method illustrated in FIG. 8 can be performed by one or more components of the computing system FIG. 1, such as the advice planner (116).

At Step 810, a determination is made whether a distinct action logic of the set action logic in the plan is associated with an application programming interface (API) endpoint; The determination can be analyzing the set of action logic and identifying specific actions that interact with external services through API endpoints. For example, index or lookup table may list action logic associated with known API endpoints that correspond to the action logic. The association can be determined by querying the index or lookup table to identify the API endpoints associated with the action logic that was identified.

At Step 820, the prompt to the LLM is generated, including the API endpoint and instructions to insert a hyperlink to the API endpoint in the advice. In other words, the the prompt to the LLM is generates after association is identified. In this example, the prompt is structured to include the API endpoint information that specifies the location of the external service, such as a URL address. In some embodiments, the prompt may also indicate a functionality provided by the service at the API endpoint. The prompt may also include instructions for inserting a hyperlink to the API endpoint in the advice generated from the prompt. the instructions can be included. This allows the generated advice to contain a clickable link that directs the user to the relevant API endpoint for further interaction At Step 830, a call to the API end point is generated, including at least a portion of the state of the account. They call it can be created, for example using a user device in response to a user's interaction with a hyperlink inserted into the advice delivered to the user. The call can be created using the information provided in the prompt, including the API endpoint and instructions. The call may include a portion of the state of the account, which provides context or data relevant to the specific action associated with the API endpoint. This enables the external service to process the request with the necessary information from the account state.

While the various steps in this flowchart are presented and described sequentially, at least some of the steps may be executed in different orders, may be combined or omitted, and at least some of the steps may be executed in parallel. Furthermore, the steps may be performed actively or passively.

Figure 9:
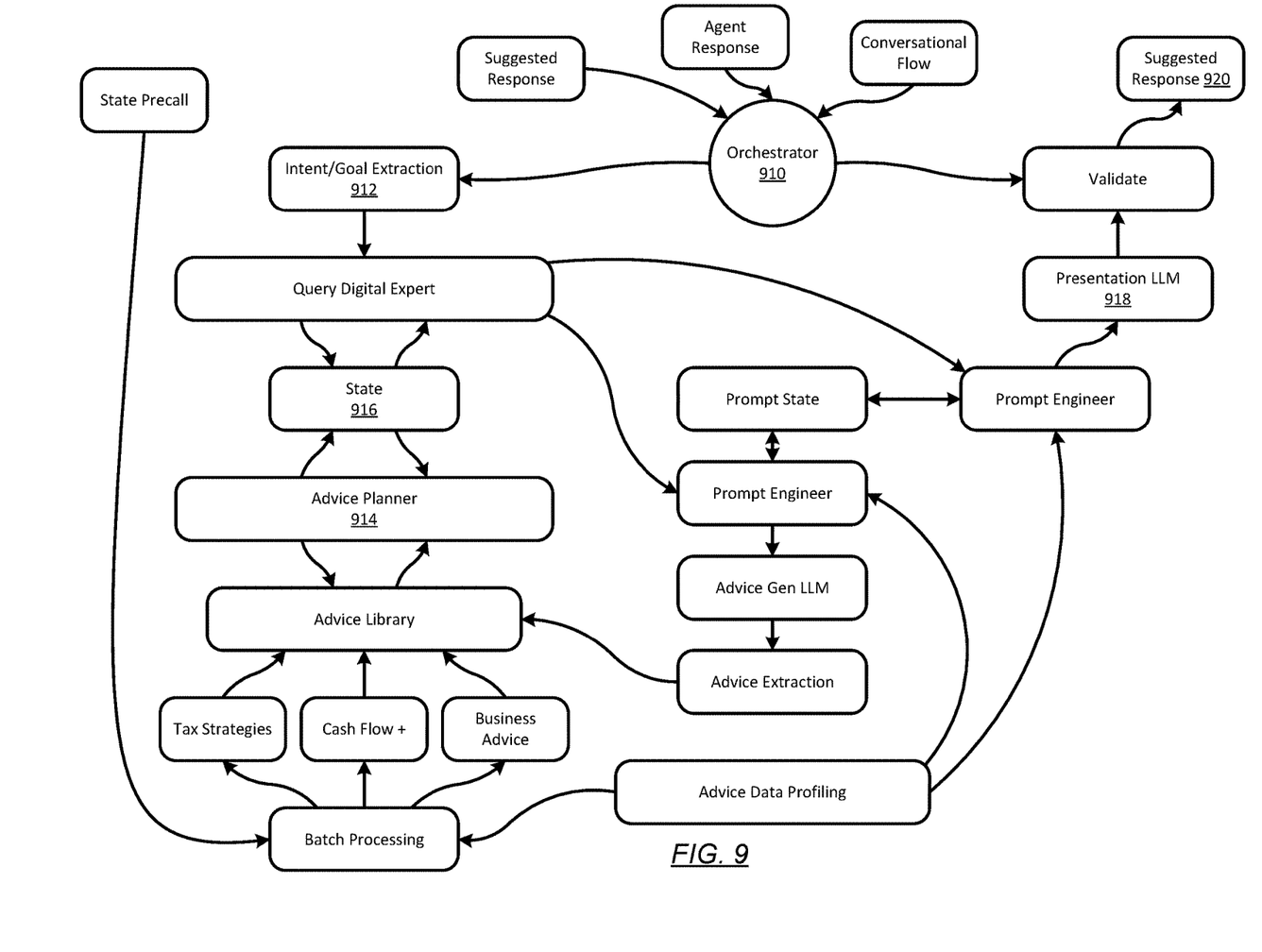
FIG. 9 is a diagram of use case for generating advice in the context of a financial planning application in accordance with one or more illustrative embodiments.

Referring now to FIG. 9, a spaghetti diagram of use case for generating advice in the context of a financial planning application is shown in accordance with one or more illustrative embodiments. The following example is for explanatory purposes only and not intended to limit the scope of the invention.

The user interacts with a financial planning application through their device, such as a smartphone or computer. The application is equipped with an advice planner, which serves as the core component responsible for generating personalized financial advice. the application be customer facing, such as an interface that allows a user to directly access and receive advice from the financial planning system. Alternatively, the application can be agent facing, where the user can a service agent providing live help to a customer In this embodiment, the system is managed by an orchestrator (910). The orchestrator is a software component or platform that manages the coordination and automation of various components, services, and resources within financial planning system. It acts as a central control system that oversees the execution of tasks, the flow of data, and the interactions between different software components, ensuring they work together efficiently and effectively.

To begin the process, the orchestrator (910) receives a request from the use. For example, they might input, "I want to save for retirement" or "I need help with budgeting and reducing expenses." This text-based input is received by the financial planning application on the user's device. Alternatively, the request can be interpreted based on a conversational flow between a customer user, an agent user, and/or the financial planning application.

Intent/goal extraction (912) utilizes a large language model (LLM) to process the user's text input and generate an intent that accurately represents their financial goal or purpose. For example, Intent/goal extraction (912) can be implemented as large language model (114) of FIG. 1.

The advice planner (914) is an example of the advice planner (116) of FIG. 1. The advice planner (914) receives this intent from intent/goal extraction (912) as the first input. Simultaneously, the advice planner (914) retrieves the current state (916) of the user's financial accounts, including their income, expenses, savings, investments, and debts. This state (916) of the user's account serves as the second input to the advice planner, providing crucial context and relevant financial information.

The advice planner classifies the user's intent into a specific financial domain. This classification enables the planner to identify the appropriate context and framework for generating tailored financial advice. For example, if the user's intent is focused on retirement planning, the advice planner categorizes the intent within the retirement domain.

Based on the classified intent and the user's financial account state, the advice planner generates a plan comprising a set of action logic associated with the retirement domain. Each action logic represents a discrete step in an ordered sequence for achieving the desired retirement goals. The plan may include recommendations such as increasing retirement contributions, diversifying investments, or exploring tax-efficient retirement savings options.

For example, the advice planner (914) may include a constraint-based solver designed to find solutions to problems suggested in the intent/goal extraction (912), subject to a set of constraints shaped by the state (916) of the user's account. These constraints represent limitations, requirements, or rules that the solution must satisfy. The solver works by iteratively exploring the solution space to identify a feasible solution that meets all the specified constraints. In this example, the solution is the orchestrated sequence of action logics that comprise a financial plan achieve the user's intent.

The generated plan is then forwarded to the presentation LLM (918) for further processing. The LLM utilizes its language generation capabilities to transform the plan into personalized financial advice. It considers the user's intent, account state, and the specific steps outlined in the plan to produce coherent and contextually relevant advice in a natural language format.

The advice generated by the presentation LLM (918) is then forwarded back to the user has suggested response (920). in this manner, the financial planning application delivers the advice to the user, who can conveniently access and review it through the application's interface. The advice provides actionable recommendations, guidance, and insights tailored to the user's financial goals, current account state, and the identified retirement domain.

As the user follows the advice and acts on the recommended steps, the financial planning application may provide additional features such as progress tracking, financial simulations, and ongoing monitoring. The user can update their account state periodically, and the advice planner can adjust the plan and advice accordingly to reflect the updated information.

By leveraging the large language model (LLM) for intent generation, the advice planner's domain classification, and the generation of personalized plans and advice, the application can provide tailored financial guidance to users. This advice planner of this use case empowers individuals to make informed financial decisions, improve their financial well-being, and work towards their long-term financial goals.

Figure 10A:
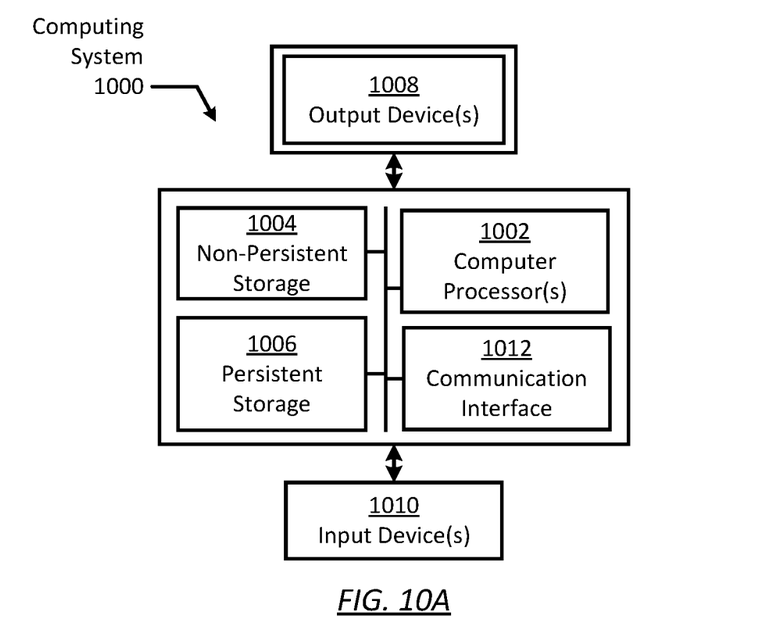
FIG. 10A and FIG. 10B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 10A, the computing system (1000) may include one or more computer processor(s) (1002), non-persistent storage (1004), persistent storage (1006), a communication interface (1012) (e.g., Bluetooth interface, infrared interface, network interface, optical interface, etc.), and numerous other elements and functionalities that implement the features and elements of the disclosure. The computer processor(s) (1002) may be an integrated circuit for processing instructions. The computer processor(s) may be one or more cores or micro-cores of a processor. The computer processor(s) (1002) includes one or more processors. The one or more processors may include a central processing unit (CPU), a graphics processing unit (GPU), a tensor processing unit (TPU), combinations thereof, etc.

The input devices (1010) may include a touchscreen, keyboard, mouse, microphone, touchpad, electronic pen, or any other type of input device. The input devices (1010) may receive inputs from a user that are responsive to data and messages presented by the output devices (1008). The inputs may include text input, audio input, video input, etc., which may be processed and transmitted by the computing system (1000) in accordance with the disclosure. The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the output devices (1008) may include a display device, a printer, external storage, or any other output device. One or more of the output devices may be the same or different from the input device(s). The input and output device(s) may be locally or remotely connected to the computer processor(s) (1002). Many different types of computing systems exist, and the aforementioned input and output device(s) may take other forms. The output devices (1008) may display data and messages that are transmitted and received by the computing system (1000). The data and messages may include text, audio, video, etc., and include the data and messages described above in the other FIGS. of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 10B:
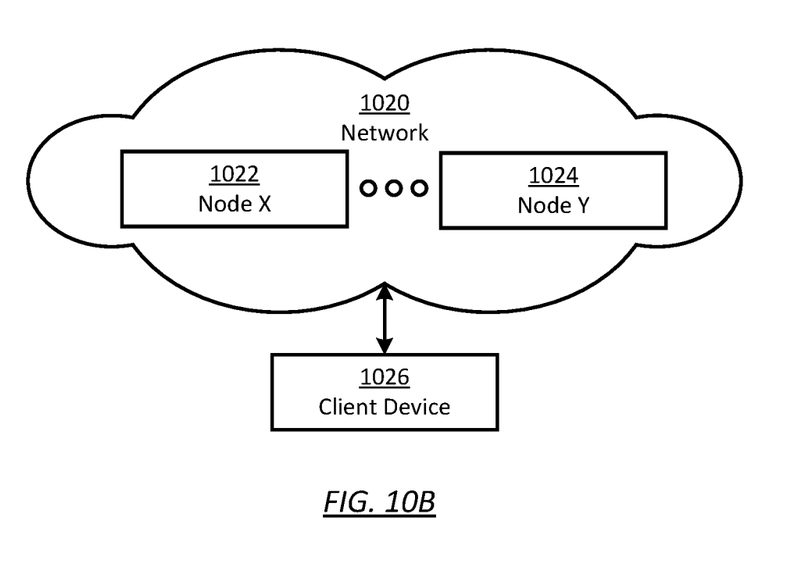

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A, or a group of nodes combined may correspond to the computing system shown in FIG. 10A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

The nodes (e.g., node X (1022), node Y (1024)) in the network (1020) may be configured to provide services for a client device (1026), including receiving requests and transmitting responses to the client device (1026). For example, the nodes may be part of a cloud computing system. The client device (1026) may be a computing system, such as the computing system shown in FIG. 10A. Further, the client device (1026) may include and/or perform all or a portion of one or more embodiments of the invention.

The computing system of FIG. 10A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such includes the term "and". Further, items joined by the term "or" may include any combination of the items with any number of each item unless, expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
receiving as a first input, by an advice planner, an intent generated by a large language model from a text received from a user device;
receiving as a second input, by the advice planner, a state of an account;
classifying, by the advice planner, the intent into a domain corresponding to the intent;
generating as output, by the advice planner, a plan comprising a first set of action logic associated with the domain, wherein each action logic in the first set is a discrete step in an ordered sequence for achieving a desired state of the account;
forwarding, by the advice planner, the plan to the large language model (LLM), wherein the large language model receives the plan as input and generates advice in a natural language format as output; and
forwarding the advice to the user device.

2. The method of claim 1, wherein the advice planner comprises classification model.

3. The method of claim 1, wherein the first input to the advice planner is a text input.

4. The method of claim 1, wherein the second input to the advice planner is a vector input that represents the state of the account.

5. The method of claim 1, wherein the first set of action logic is defined in an ontology stored in an advice library as a set of machine-interpretable logic descriptions.

6. The method of claim 5, further comprising:
generating a prompt to the LLM from a template and the intent, wherein the large language model receives the prompt as input and generates a second set of action logic formatted as a machine-interpretable logic description; and
updating the advice library to include the second set of action logic.

7. The method of claim 6, further comprising:
retraining the advice planner from both the first set of action logic and the second set of action logic.

8. The method of claim 1, wherein the advice planner comprises a reinforcement learning model, wherein the state is a first state of the account, the method further comprising:
receiving a second state of the account;
determining whether a first action logic of the plan was performed between the first state and the second state; and
adjusting, by the advice planner, a set of weights associated with the first action logic based on a delta between the first state and the second state.

9. The method of claim 8, wherein adjusting the set of weights further comprises:
increasing the set of weights in response to determining that the first action logic was performed between the first state and the second state; and
decreasing the set of weights in response to determining that the first action logic was not performed between the first state and the second state.

10. The method of claim 8, wherein adjusting the set of weights further comprises:
increasing the set of weights when the second state is closer than the first state to the desired state; and
decreasing the set of weights when the first state is closer than the second state to the desired state.

11. The method of claim 1, wherein forwarding the plan to the large language model further comprises:
generating a prompt to the LLM from a template and the set of action logic in the plan.

12. The method of claim 11, wherein generating the plan further comprises:
determining that a distinct action logic of the set of action logic in the plan is associated with an application programming interface (API) endpoint; and
generating the prompt to the LLM, wherein the prompt includes the API endpoint and instructions to insert a hyperlink to the API endpoint in the advice.

13. The method of claim 12, further comprising:
generating a call to the API end point, wherein the call includes at least a portion of the state of the account.

14. A system comprising:
a data repository storing an advice library comprising an ontology of action logic formatted as a set of machine-interpretable logic descriptions; and
a computer processor for executing an advice planner that is configured to:
   receive, as a first input, an intent generated by a large language model from a text received from a user device;
   receive, as a second input, a state of an account;
   classify the intent into a domain corresponding to the intent;
   generate, as output, a plan comprising a first set of action logic associated with the domain, wherein each action logic in the first set is a discrete step in an ordered sequence for achieving a desired state of the account;
   forward the plan to the large language model (LLM), wherein the large language model receives the plan as input and generates advice in a natural language format as output; and
   forwarding the advice to the user device.

15. The system of claim 14, wherein the first input to the advice planner is a text input and the second input to the advice planner is a vector input that represents the state of the account.

16. The system of claim 14, wherein the first set of action logic is defined in an ontology stored in an advice library as a set of machine-interpretable logic descriptions.

17. The system of claim 14, wherein the advice planner is further configured to:
   generate a prompt to the LLM from a template and the intent, wherein the large language model receives the prompt as input and generates a second set of action logic formatted as a machine-interpretable logic description; and
   update the advice library to include the second set of action logic.

18. The system of claim 14, wherein the advice planner comprises classification model, and wherein the advice planner is further configured to:
   retrain the classification model from both the first set of action logic and a second set of action logic.

19. The system of claim 14, wherein the advice planner comprises a reinforcement learning model, wherein the state is a first state of the account, and wherein the advice planner is further configured to:
   receive a second state of the account;
   determine whether a first action logic of the plan was performed between the first state and the second state; and
   adjust a set of weights associated with the first action logic based on a delta between the first state and the second state.

20. A non-transitory computer readable storage medium storing program code which, when executed by a processor, performs a computer-implemented method, the computer-implemented method comprising:
   receiving as a first input, by an advice planner, an intent generated by a large language model from a text received from a user device;
   receiving as a second input, by the advice planner, a state of an account;
   classifying, by the advice planner, the intent into a domain corresponding to the intent;
   generating as output, by the advice planner, a plan comprising a first set of action logic associated with the domain, wherein each action logic in the first set is a discrete step in an ordered sequence for achieving a desired state of the account;
   forwarding, by the advice planner, the plan to the large language model (LLM), wherein the large language model receives the plan as input and generates advice in a natural language format as output; and
   forwarding the advice to the user device.

* * * * *